US 9,505,324 B2

(12) United States Patent
McMillen et al.

(10) Patent No.: US 9,505,324 B2
(45) Date of Patent: Nov. 29, 2016

(54) ADJUSTABLE BOLSTER

(71) Applicant: Leggett & Platt Canada Co., Halifax (CA)

(72) Inventors: Robert J. McMillen, Tecumseh (CA); Larry Janzen, Belle River (CA); Paul Tindall, Harrow (CA); Jacob Friesen, Leamington (CA); Corina Alionte, Windsor (CA)

(73) Assignee: LEGGETT & PLATT CANADA CO., Halifax, Nova Scotia (CA)

( * ) Notice: Subject to any disclaimer, the term of this patent is extended or adjusted under 35 U.S.C. 154(b) by 0 days.

(21) Appl. No.: 14/606,853

(22) Filed: Jan. 27, 2015

(65) Prior Publication Data

US 2016/0214511 A1    Jul. 28, 2016

(51) Int. Cl.
| A47C 7/46 | (2006.01) |
| B60N 2/44 | (2006.01) |
| B60N 2/64 | (2006.01) |
| A47C 7/40 | (2006.01) |

(52) U.S. Cl.
CPC .............. B60N 2/449 (2013.01); A47C 7/40 (2013.01); B60N 2/643 (2013.01)

(58) Field of Classification Search
CPC .......... A47C 7/46; A47C 7/462; A47C 7/40; B60N 2/0232; B60N 2/449; B60N 2/66; B60N 2/643
See application file for complete search history.

(56) References Cited

U.S. PATENT DOCUMENTS

| 2,796,920 | A | * | 6/1957 | Cowles | A47C 7/448 |
| | | | | | 248/632 |
| 4,500,136 | A | | 2/1985 | Murphy et al. | |
| 4,576,410 | A | * | 3/1986 | Hattori | A47C 7/462 |
| | | | | | 297/284.4 |
| 5,791,735 | A | * | 8/1998 | Helman | A61G 5/12 |
| | | | | | 297/404 |
| 6,116,687 | A | * | 9/2000 | Vogtherr | A47C 3/026 |
| | | | | | 297/291 |
| 6,460,933 | B1 | * | 10/2002 | Bors | A61G 5/1067 |
| | | | | | 297/284.9 |
| 7,125,077 | B2 | * | 10/2006 | Frank | B60N 2/0232 |
| | | | | | 297/284.1 |
| 7,140,681 | B2 | | 11/2006 | McMillen | |
| 7,278,688 | B1 | * | 10/2007 | Hung | A47C 7/024 |
| | | | | | 297/285 |
| 7,523,992 | B1 | * | 4/2009 | Yang | A47C 7/38 |
| | | | | | 297/353 |
| 7,607,735 | B2 | * | 10/2009 | Kuno | B60N 2/0232 |
| | | | | | 297/284.6 |
| 7,967,382 | B2 | | 6/2011 | Pyun et al. | |
| 8,126,615 | B2 | | 2/2012 | McMillen et al. | |
| 8,141,952 | B2 | | 3/2012 | Poniatowski | |
| 2009/0026821 | A1 | | 1/2009 | Macht et al. | |
| 2012/0235458 | A1 | | 9/2012 | Andersson et al. | |

FOREIGN PATENT DOCUMENTS

| KR | 101440147 | 9/2014 |
| WO | 2010078861 | 7/2010 |

OTHER PUBLICATIONS

International Search Report and Written Opinion for Application No. PCT/CA2016/000017 dated Apr. 28, 2016 (8 pages).

* cited by examiner

Primary Examiner — Philip Gabler
(74) Attorney, Agent, or Firm — Michael Best & Friedrich LLP

(57) ABSTRACT

A bolster assembly for a seat includes a fixed frame and a housing coupled to the fixed frame. The housing includes a track and a bracket moveable along at least a portion the track between a first position and a second position. A paddle is moveably coupled to the bracket and a drive shaft is configured for rotation about a drive axis. Rotation of the drive shaft about the drive axis moves the bracket between the first position and the second position.

16 Claims, 9 Drawing Sheets

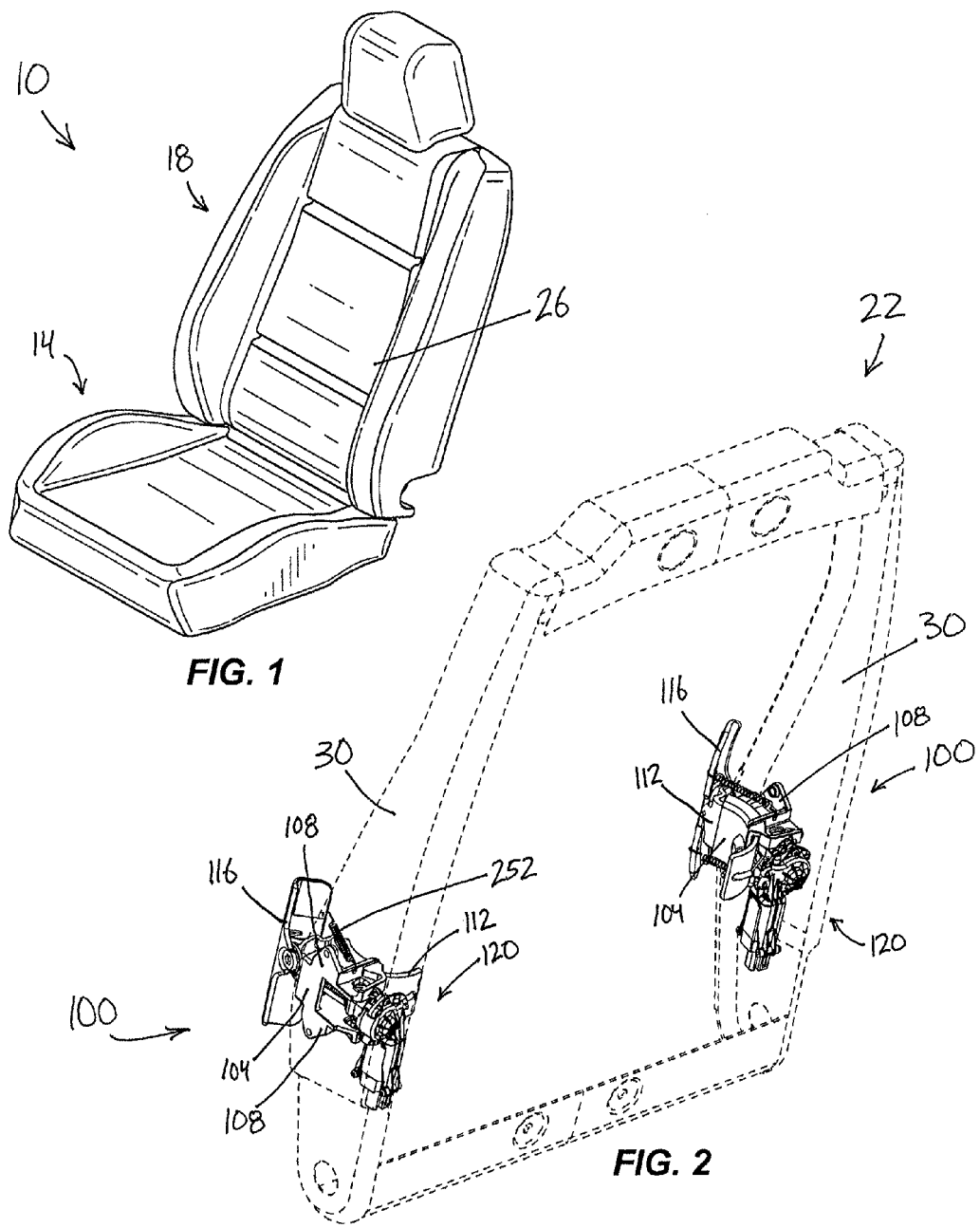

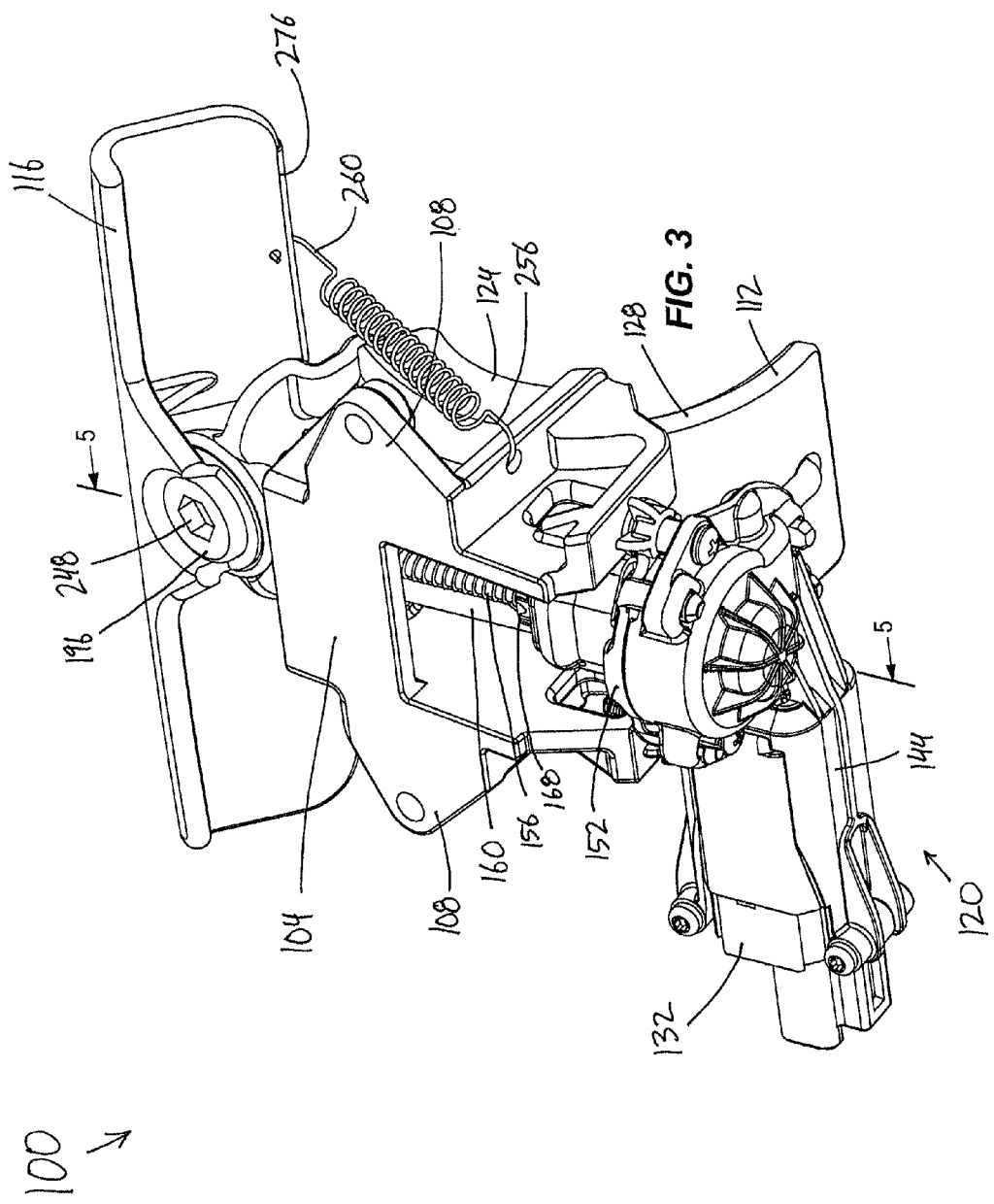

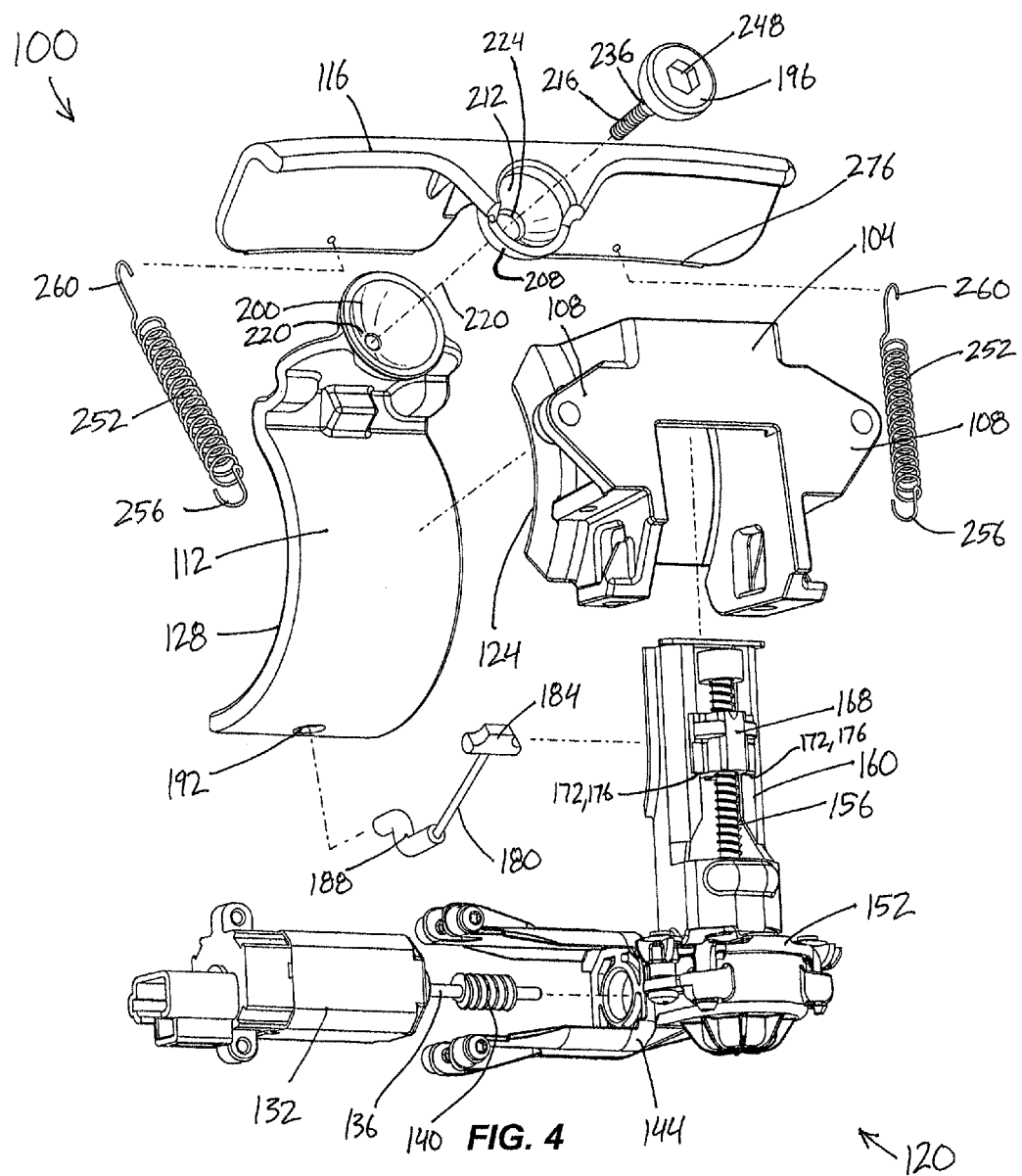

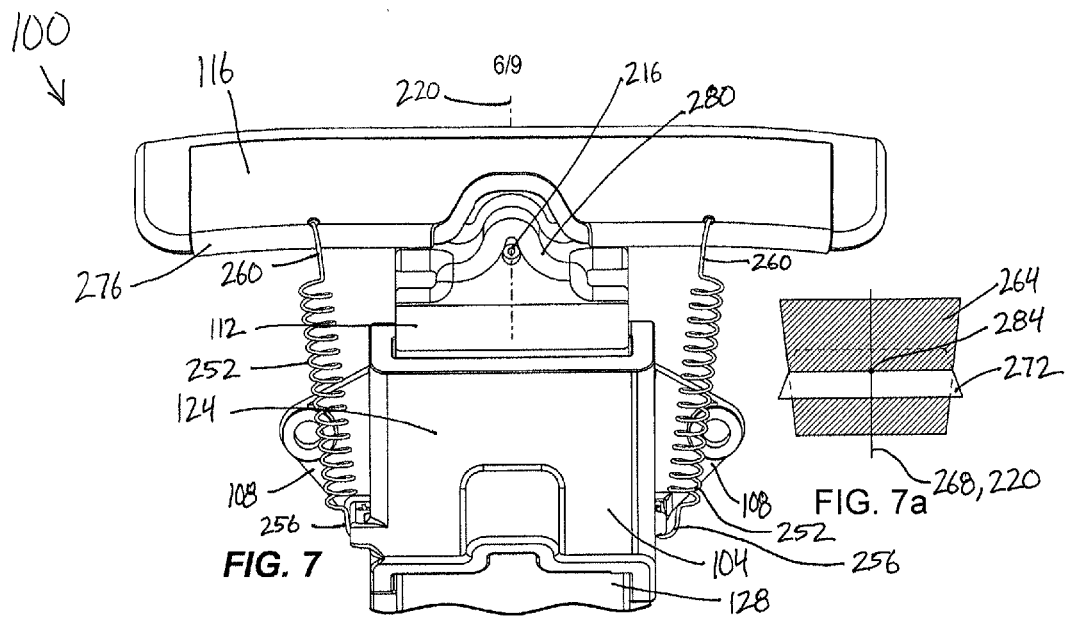
FIG. 7
FIG. 7a
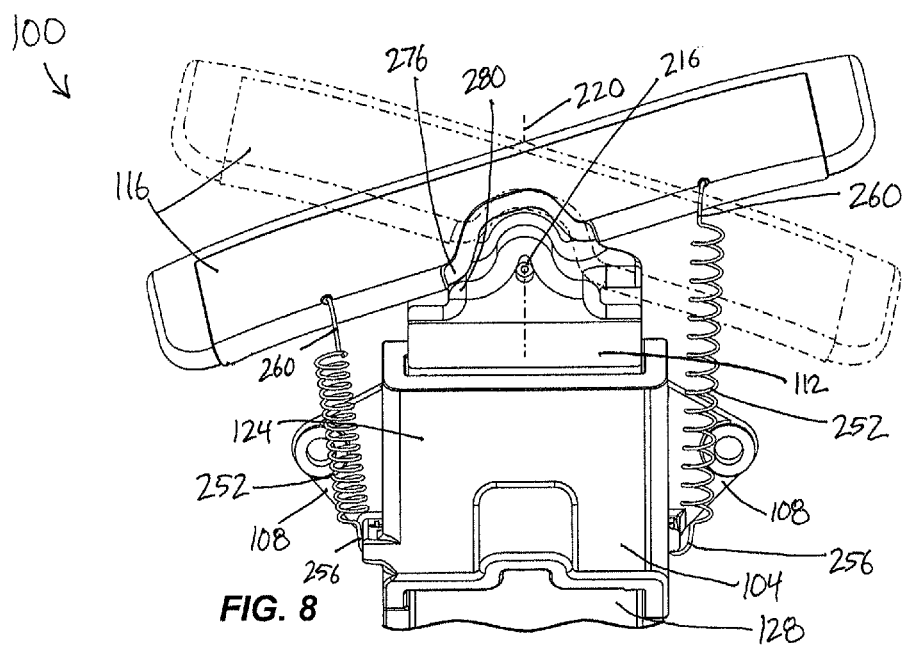
FIG. 8

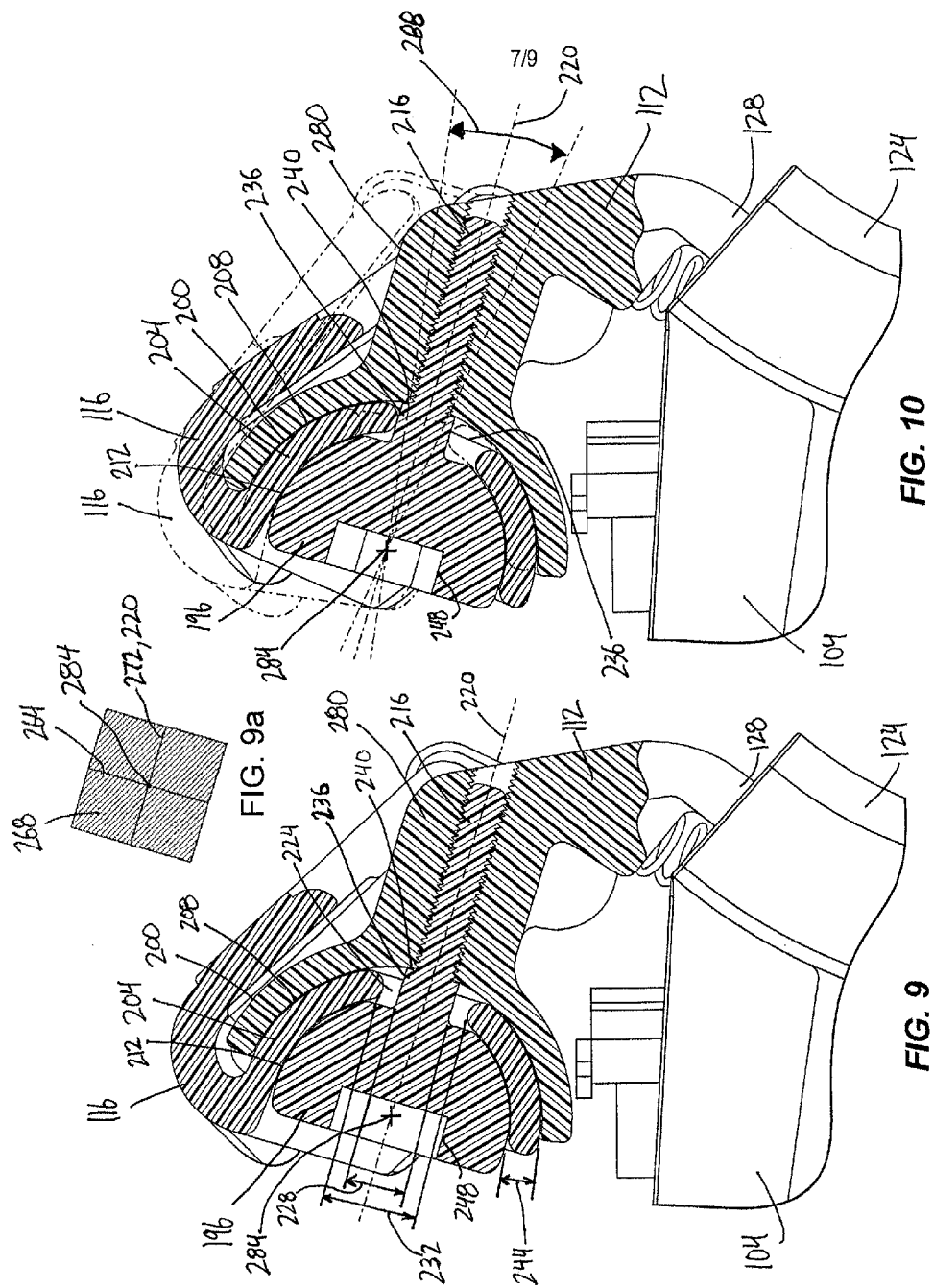

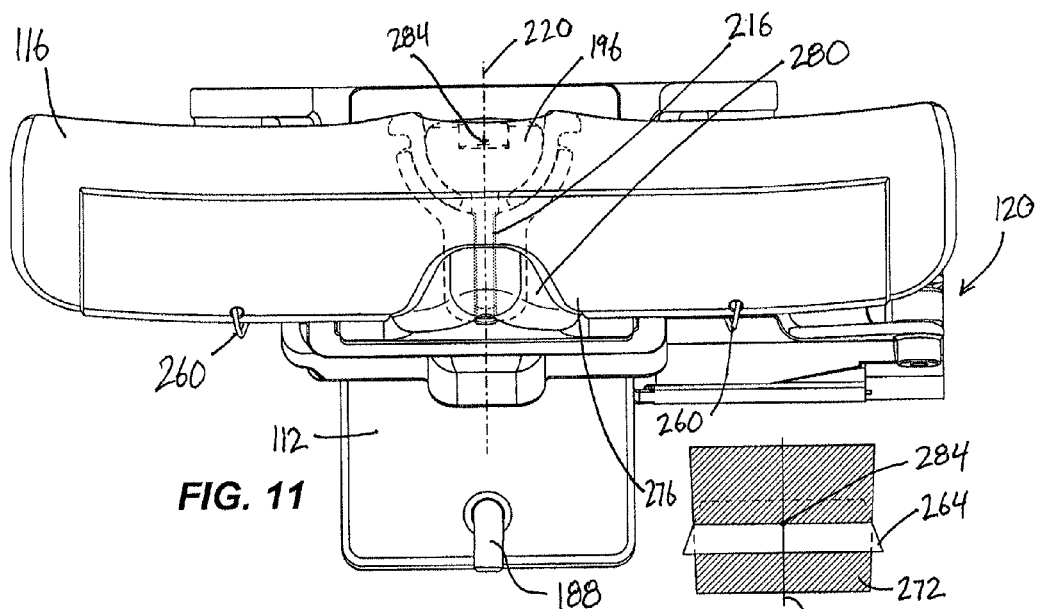
FIG. 11
FIG. 11a
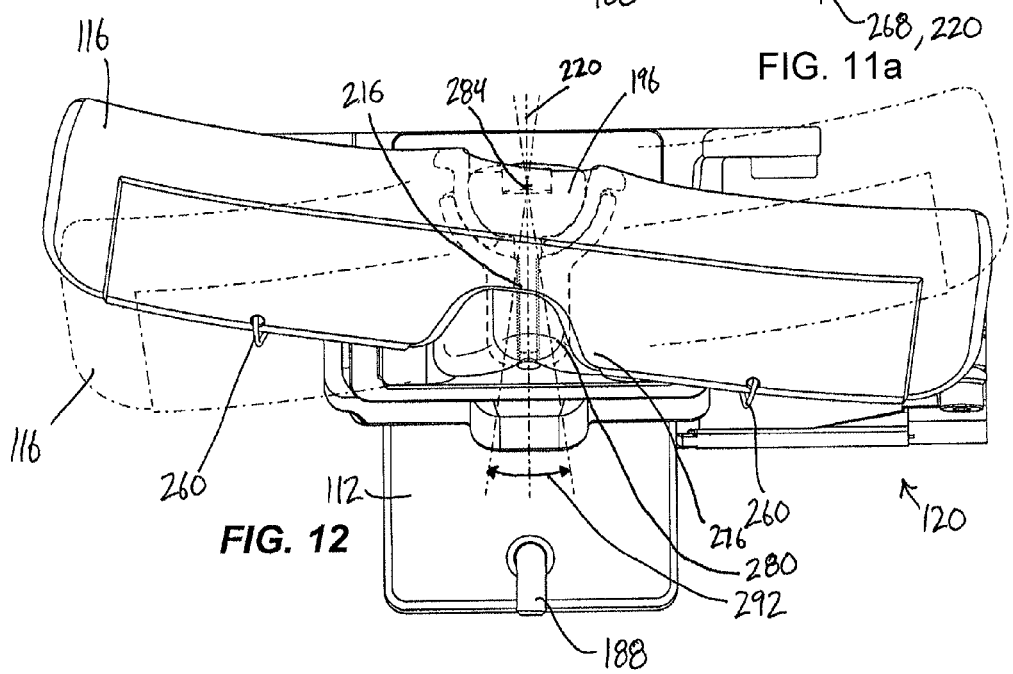
FIG. 12 ial applications. The seat 10 generally includes a seat bottom 14 and a seat backrest 18 for horizontal and vertical support, respectively, of a seat occupant, with an overlying cushion 26. With reference to FIG. 2, a frame 22, which is covered by the overlying cushion 26, provides structural integrity for the backrest 18 and includes a pair of vertical support members 30. A bolster assembly 100 is coupled to each of the vertical support members 30 to permit adjustable side bolster support for the seated occupant.
ADJUSTABLE BOLSTER

BACKGROUND

The present disclosure relates to a bolster support system for use within a seat, specifically for use within a vehicle seat.

SUMMARY

A bolster assembly for a seat includes a fixed frame and a housing coupled to the fixed frame. The housing includes a track and a bracket moveable along at least a portion the track between a first position and a second position. A paddle is moveably coupled to the bracket and a drive shaft is configured for rotation about a drive axis. Rotation of the drive shaft about the drive axis moves the bracket between the first position and the second position.

A bolster assembly includes a housing having a track portion and a bracket moveable along the track portion of the housing between a first position and a second position. In addition, the bolster assembly includes a paddle moveably coupled to the bracket.

A bolster assembly for a seat includes a fixed frame and a paddle moveably coupled to the fixed frame. The paddle is moveable with respect to the fixed frame in three orthogonal rotational planes.

Other aspects of the invention will become apparent by consideration of the detailed description and accompanying drawings.

BRIEF DESCRIPTION OF THE DRAWINGS

FIG. 1 is a perspective view of a vehicle seat.

FIG. 2 is a partial perspective view of the vehicle seat of FIG. 1 with two bolster assemblies.

FIG. 3 is a perspective view of the bolster assembly of FIG. 2.

FIG. 4 is an exploded view of the bolster assembly of FIG. 2.

FIG. 7 is a front view of the bolster assembly of FIG. 3 with a paddle in a neutral position.

FIG. 7a illustrates orientation references associated with FIGS. 7 and 8.

FIG. 8 is a front view of the bolster assembly of FIG. 3 with the paddle rotated within a first plane to a rotated position shown in solid lines and another rotated position shown in dashed lines.

FIG. 9 is an enlarged, partial section view from line 5-5 of FIG. 3 of the bolster assembly with the paddle in the neutral position.

FIG. 9a illustrates orientation references associated with FIGS. 9 and 10.

FIG. 10 is an enlarged, partial section view from line 5-5 of FIG. 3 of the bolster assembly with the paddle rotated within a second plane to a rotated position shown in solid lines and another rotated position shown in dashed lines.

FIG. 11 is a top view of the bolster assembly of FIG. 3 with the paddle in the neutral position.

FIG. 11a illustrates orientation references associated with FIGS. 11 and 12.

FIG. 12 is a top view of the bolster assembly of FIG. 3 with the paddle rotated within a third plane to a rotated position shown in solid lines and another rotated position shown in dashed lines.

DETAILED DESCRIPTION

Figure 5:
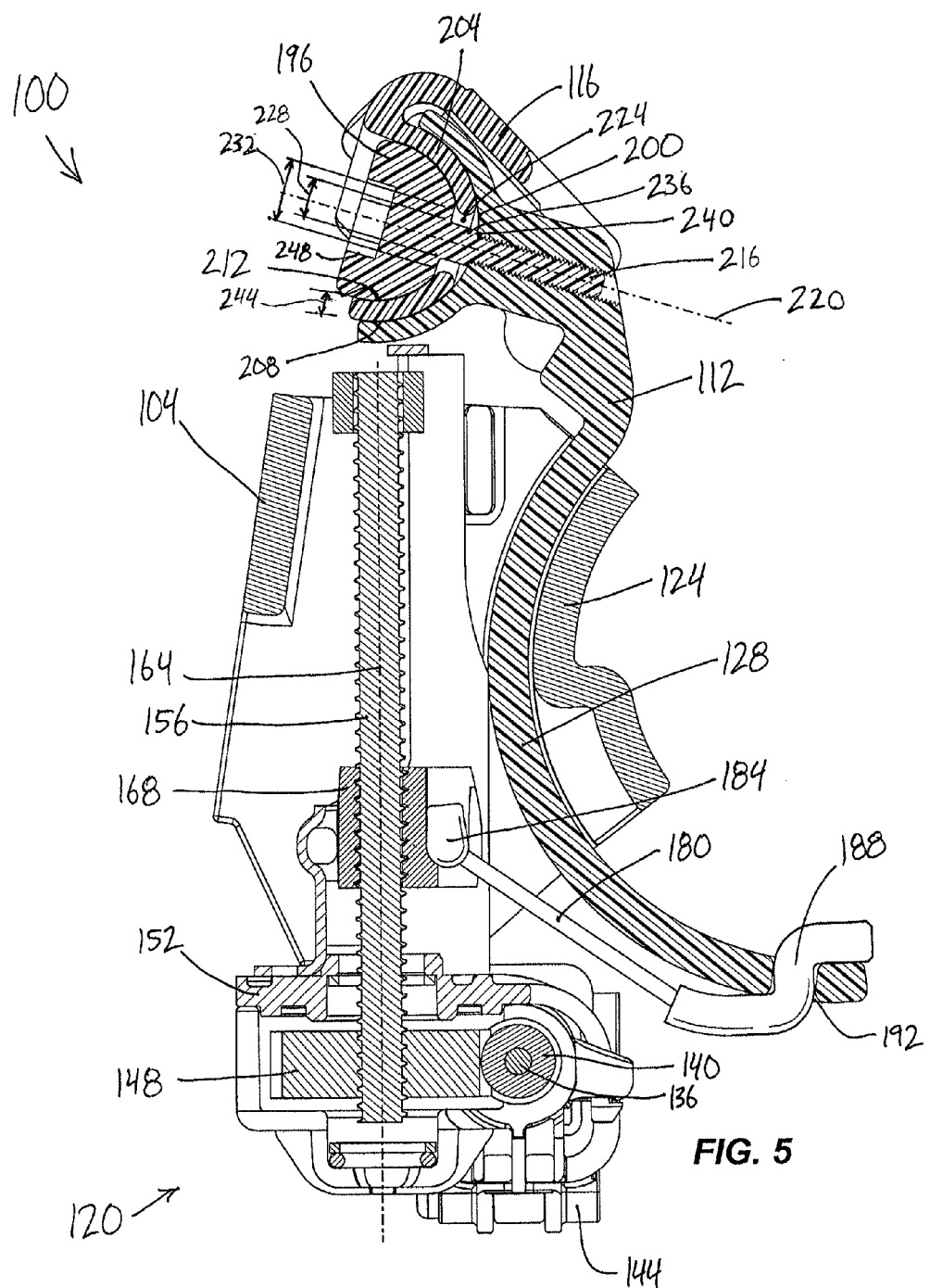
FIG. 5 is a section view from line 5-5 of FIG. 3 of the bolster assembly in a retracted position.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used therein and in the appended claims, the terms "upper," "lower," "top," "bottom," "front," "back," and other directional terms are not intended to require any particular orientation, but are instead used for purposes of description only.

FIG. 1 illustrates a seat 10, which for the purposes of the following description may be any vehicle seat within the passenger compartment of a vehicle, though the seat 10 is not necessarily limited to vehicular applications. The seat 10 generally includes a seat bottom 14 and a seat backrest 18 for horizontal and vertical support, respectively, of a seat occupant, with an overlying cushion 26. With reference to FIG. 2, a frame 22, which is covered by the overlying cushion 26, provides structural integrity for the backrest 18 and includes a pair of vertical support members 30. A bolster assembly 100 is coupled to each of the vertical support members 30 to permit adjustable side bolster support for the seated occupant.

With continued reference to FIG. 2, the frame 22 is illustrated with the cushion 26 removed to show the mounting location of the bolster assemblies 100. Each bolster assembly 100 includes a housing 104 fixedly coupled to the frame 22 via mounting tabs 108. Although FIG. 2 only shows each bolster assembly 100 mounted in a particular location on the frame 22, any number of mounting locations along the frame 22 and within the seat 10 are possible. For example, a bolster assembly 100 may also be utilized in the seat bottom 14 to support an occupant's thigh region, and is not necessarily limited to backrest side bolster applications.

FIG. 3 illustrates the bolster assembly 100 including the housing 104 and having a bracket 112, a paddle 116 moveably coupled to the bracket 112, and a drive assembly 120. The housing 104 includes a track 124 that is arcuate in shape. Alternative constructions may include a linear track. Correspondingly, the bracket 112 includes an arcuate portion 128 such that the bracket 112 is moveable along at least a portion of the track 124 between a first position (e.g., a retracted position (FIG. 5)) and a second position (e.g., an extended position (FIG. 6)). As described in greater detail below, the bracket 112 is driven to move along the track 124 by the drive assembly 120, which can be controlled and activated by the seat occupant.

Referring to FIGS. 3-5, the drive assembly 120, or actuator, includes a motor 132, a motor shaft 136 with a pinion 140, a motor housing 144, a worm gear 148, a cap 152, a drive shaft 156, and a slide frame 160. The motor 132, secured to the motor housing 144, is preferably a D.C. reversible motor but can be any type of reversible motor suitable for the application and can further be varied in size and power as necessary. The worm gear 148 (FIG. 5), operatively engaged with the pinion 140 of the motor shaft 136, permits an orthogonal change of direction of the power applied to the drive shaft 156 and an increase in output torque from the motor 132. The worm gear 148 is contained within the motor housing 144, which also couples the motor 132 to the remaining drive assembly components. The drive shaft 156 is splined, or threaded, and mates with the worm gear 148 for co-rotation about a drive axis 164 and transfer of power during operation. The cap 152, attached to the motor housing 144, provides additional protection for the worm gear 148 and drive shaft 156 and further secures the motor housing 144 to the housing 104 and the slide frame 160.

A traveling member, or slider 168, is positioned about the drive shaft 156 and includes an internally threaded body for engagement with the drive shaft 156. In addition, the slider 168 includes opposing grooves 172 that mate with opposing guide rails 176 formed on the slide frame 160. A flexible cable 180 includes a first end 184 coupled to the slider 168 and a second end 188 coupled to the bracket 112 through a bracket bore 192. As an alternative, the slider 168 may be directly coupled to the bracket 112 without any intermediate connecting members, i.e., a direct drive arrangement in which movement of the slider 168 would directly drive the bracket 112.

With continued reference to FIG. 4, the bolster assembly 100 includes a ball pivot 196 moveably coupling the paddle 116 to the bracket 112. The bracket 112 includes a bowl portion 200, and the paddle 116 includes a corresponding dome portion 204. An outer surface 208 of the dome portion 204 is mated (e.g., nested) with the bowl portion 200, and an inner surface 212 of the dome portion 204 is mated with the ball pivot 196. The ball pivot 196 further includes a pin 216 defining a longitudinal axis 220 and coupling the paddle 116 to the bracket 112. The paddle 116 includes a bore 224 through which the pin 216 extends, and the pin 216 is engaged with the bracket 112 with, for example, a threaded connection. In alternative constructions, the pin can be engaged with the bracket through a press-fit connection, or other similar connection. The pin 216 has a first diameter 228, and the bore 224 formed in the paddle 116 has a second diameter 232 larger than the first diameter 228.

When assembled, the dome portion 204 of the paddle 116 is positioned between the ball pivot 196 and the bowl portion 200 of the bracket 112. The ball pivot 196 further includes a shoulder 236 on the pin 216 and the bracket 112 includes a corresponding stop 240. The shoulder 236 and the stop 240 cooperatively engage to create a gap 244 between the ball pivot 196 and the bracket 112. The dome portion 204 of the paddle 116 is positioned and movable within the gap 244 such that the paddle 116 is operable to move with respect to the ball pivot 196 and therefore with respect to the bracket 112, as described in further detail below.

The gap 244 sets the maximum clamping force acting on the dome portion 204 of the paddle 116. With continued reference to FIGS. 3-5, the ball pivot 196 includes a hex opening 248 for tightening the pin 216 into the bracket 112, and the shoulder 236 and the stop 240 prevent the pin 216 from being over-tightened, which would prevent the paddle 116 from moving. As an option, lubricant can be positioned on both the inner surface 212 and the outer surface 208 of the dome portion 204 to minimize wearing. In the illustrated embodiment, the gap 244 is set by the shoulder 236 on the ball pivot 196 and the stop 240, but in other alternative constructions, the gap 244 may be set, limited, or adjusted in another manner. For example, the gap 244 may be set by replacing the pin 216 with a shoulder bolt such that the shoulder bolt engages the ball pivot to limit the amount that the shoulder bolt may be tightened and to set the gap 244.

In this way, the paddle 116 is secured in the gap 244 between the ball pivot 196 and the bracket 112 but is still capable of moving relative to the bracket 112. The bore second diameter 232 only needs to be greater than the pin first diameter 228 in order to permit relative movement of the pin 216 within the bore 224. In the illustrated embodiment, the second diameter is at least 70% greater than the first diameter, and in alternative constructions, the second diameter can be as small as 10% greater than the first diameter, or as small as 1% greater than the first diameter, depending on the desired amount of paddle movement. Although in the illustrated embodiment the pin 216 is shown as integrally formed as one piece with the ball pivot 196, in alternative constructions the pin may be a separate component from the remaining ball pivot.

With reference to FIGS. 3 and 4, the bolster assembly 100 further includes a plurality of biasing members 252 coupled to the paddle 116. The first end 256 of each biasing member 252 is coupled to the housing 104, and the second end 260 of each biasing member 252 is coupled to the paddle 116. The biasing members 252 bias the paddle 116 into a neutral position relative to the bracket 112, and provide resistance to hinder unconstrained motion of the paddle 116 relative to the bracket 112. In addition, as discussed below with regard to the operation, the biasing member 252 assists the bracket 112 in returning from the extended, second position (FIG. 6) to the retracted, first position (FIG. 5).

Figure 6:
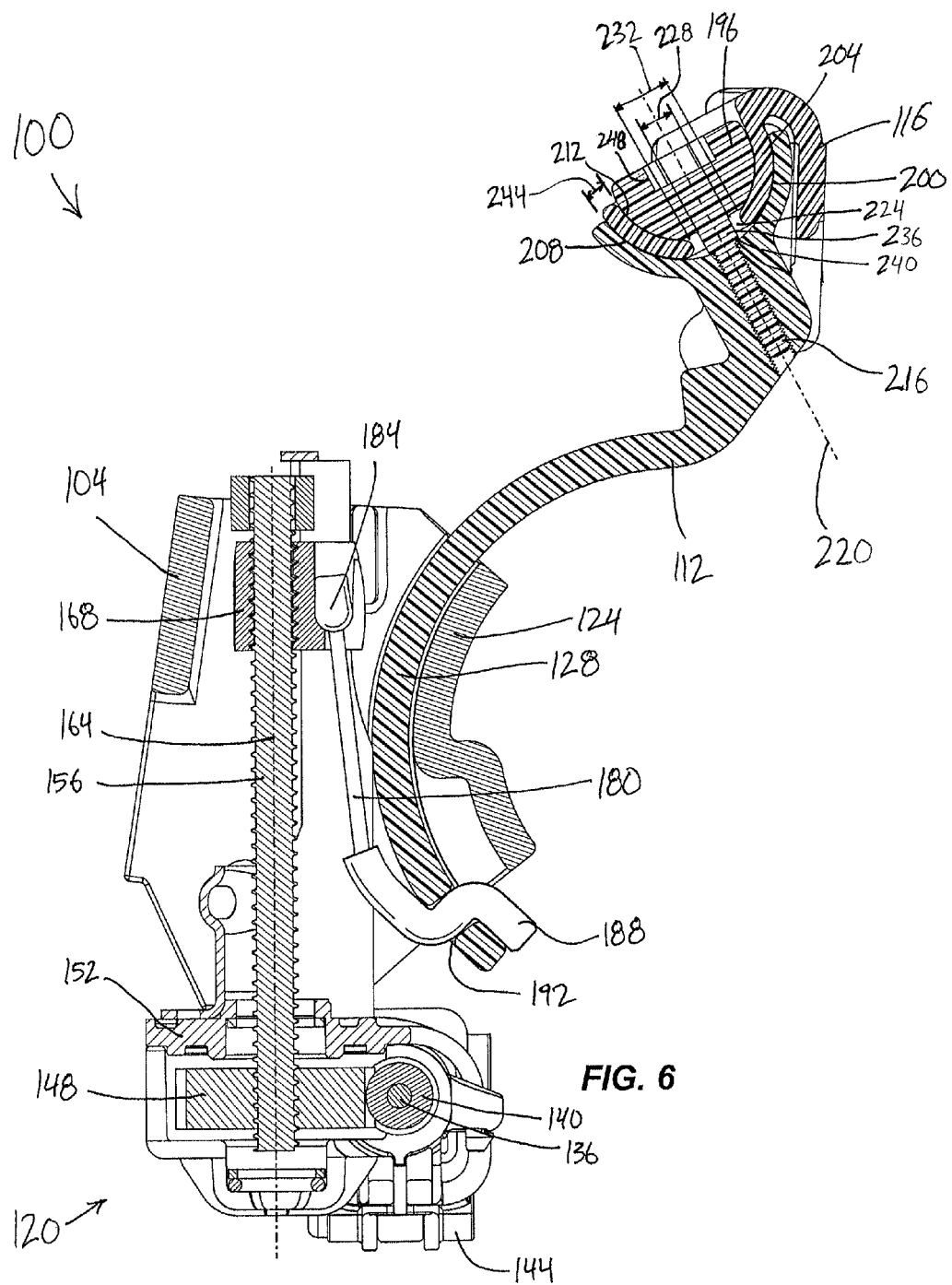
FIG. 6 is a section view from line 5-5 of FIG. 3 of the bolster assembly in an extended position.

In operation, the seat occupant may activate the drive assembly 120 to adjust the position of the bracket 112 with respect to the housing 104. Depending on the occupant's selection, the motor shaft 136 is activated to rotate either clockwise or counterclockwise, and the rotation is transferred through the pinion 140 and the worm gear 148 to rotate the drive shaft 156. With reference to FIGS. 5 and 6, upon rotation of the drive shaft 156 in a first rotational direction, the slider 168 translates along the drive shaft 156 in a first translational direction, and upon rotation of the drive shaft 156 in a second, opposite direction, the slider 168 translates along the drive shaft 156 in a second, opposite translational direction. The bracket 112 is connected through the cable 180 to the slider 168 such that as the slider 168 moves along the drive shaft 156, the bracket 112 moves in the track 124 between the first, retracted position (FIG. 5) to the second, extended position (FIG. 6). As mentioned above, the biasing members 252 assist the bracket 112 in returning to the first, retracted position (FIG. 5) once the slider 168 has returned to the end of the drive shaft 156 closest to the motor 132. Also, the occupant's weight urges the bracket 112 to return to the retracted position once the slider 168 is returned to the position shown in FIG. 5.

The paddle 116, as previously described, is moveably coupled to the bracket 112. The term "moveably coupled" encompasses any relative motion of the paddle 116 with respect to the bracket 112 including, but not limited to, rotation, pivoting, swiveling, or bending. In particular, the paddle 116 cooperates with the body position of the seat occupant and moves with respect to the bracket 112 to minimize hard spots felt in the seat by the occupant or otherwise improve the comfort level of the seat occupant. In other words, in order to comfortably support a wide range of seat occupants (e.g., short, tall, thin, or wide occupants), the paddle 116 automatically responds to the position of the seat occupant to provide further degrees-of-freedom in addition to the movement of the bracket 112 between the first position (FIG. 5) and the second position (FIG. 6).

With reference to FIGS. 7-12, operational movement of the paddle 116 relative to the bracket 112 will now be described in detail. Starting with FIGS. 7, 7a, and 8, the paddle 116 is rotatable in response to the seat occupant's body positioning about the longitudinal axis 220 of the pin 216, in a first rotational plane 264 relative to the bracket 112. FIG. 7 illustrates the paddle 116 in a neutral, at rest, position. FIG. 8 illustrates the paddle 116 rotated within the first plane 264 to a first rotated position (shown in solid lines) and a second rotated position (shown in dashed lines). The first rotational plane 264 is orthogonal to the longitudinal axis 220 and is illustrated with shading in FIG. 7a to indicate the plane of rotation corresponding to FIG. 8. In the illustrated embodiment, approximately 36 degrees of rotation separate the first rotated position (shown in solid lines) and the second rotated position (shown in dashed lines) of FIG. 8, i.e., the first and second rotated positions are each approximately 18 degrees from the neutral position. In other constructions, the first rotated position and the second rotated position can each range up to 30 degrees from the neutral position. The rotation of the paddle 116 in the first rotational plane 264 is limited by a lip member 276 extending around the perimeter of the paddle 116, a portion of which abuts a nose portion 280 of the bracket 112.

With reference to FIGS. 9, 9a, and 10, the paddle 116 is further rotatable in response to the seat occupant's body positioning relative to the bracket 112 in a second rotational plane 268 oriented non-parallel and also orthogonal to the first rotational plane 264. FIG. 9 illustrates the paddle 116 in the neutral position of FIG. 7, and FIG. 10 illustrates the paddle 116 rotated within the second plane 268 to a third rotated position (shown in solid lines) and a fourth rotated position (shown in dashed lines). Again, the second rotational plane 268 is illustrated with shading in FIG. 9a to indicate the plane of rotation corresponding to FIG. 10. In the illustrated embodiment, an angle 288 of approximately 16 degrees of rotation separate the third rotated position (shown in solid lines) and the fourth rotated position (shown in dashed lines) of FIG. 10. In other constructions, the third rotated position and the fourth rotated position can each range up to 10 degrees from the neutral position. In yet other embodiments, the third rotated position and the fourth rotated position can each range up to 30 degrees from the neutral position.

Additionally, with reference to FIGS. 11, 11a, and 12, the paddle 116 is further rotatable in response to the seat occupant's body positioning relative to the bracket 112 in a third rotational plane 272 oriented non-parallel and also orthogonal to the first rotational plane 264 and to the second rotational plane 268. FIG. 11 illustrates the paddle 116 in the neutral position of FIGS. 7 and 9. FIG. 12 illustrates the paddle 116 rotated within the third plane 272 to a fifth rotated position (shown in solid lines) and a sixth rotated position (shown in dashed lines). The third rotational plane 272 is illustrated with shading in FIG. 11a to indicate the plane of rotation corresponding to FIG. 12. In the illustrated embodiment, an angle 292 of approximately 16 degrees of rotation separate the fifth rotated position (shown in solid lines) and a sixth rotated position (shown in dashed lines) of FIG. 12. In other constructions, the fifth rotated position and the sixth rotated position can each range up to 10 degrees from the neutral position. In yet other embodiments, the fifth rotated position and the sixth rotated position can each range up to 30 degrees from the neutral position.

In other words, the paddle 116 is freely moveable relative to the bracket 112 in any number of directions. The ball pivot 196, the pin 216, and the bore 224 permit multi-directional movement of the paddle 116 with respect to the bracket 112. As such, the paddle 116 is moveable relative to the bracket 112 in three orthogonal planes 264, 268, 272 representative of a Cartesian frame of reference (i.e., x, y, and z directions). Although the rotational planes 264, 268, 272 are described as being orthogonal to each other, the planes in which the paddle rotates can also be described simply as non-parallel planes. During operation, when the paddle 116 moves with respect to the bracket 112 according to the seat occupant's size and shape, the movement of the paddle 116 is typically a concurrent combination of rotation in two or more of the three rotational planes 264, 268, 272. The motion of the paddle 116 can alternatively be described as rotatable/pivotable in all directions about a center point 284 of the ball pivot 196 (FIGS. 7-12).

Figure 13:
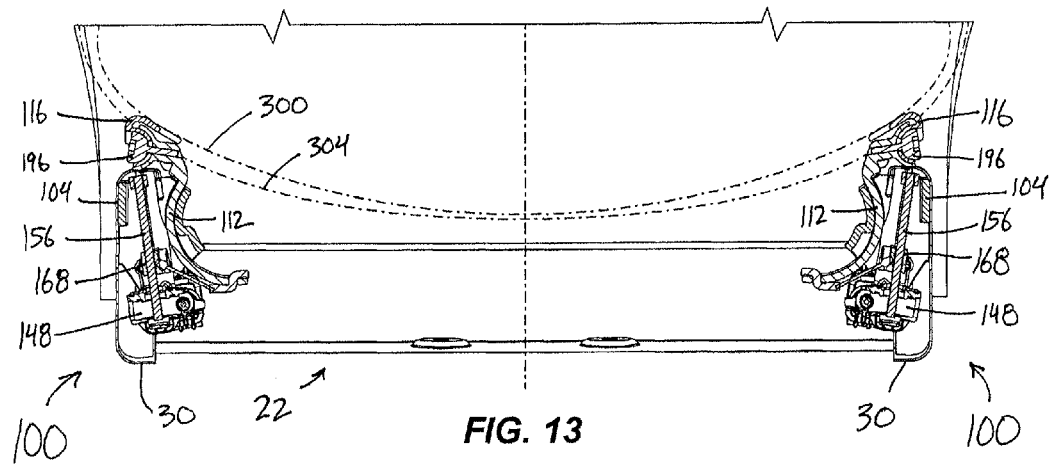
FIG. 13 is a top-down section view of the vehicle seat and the bolster assemblies of FIG. 2 with a 95th percentile male seat occupant.
Figure 14:
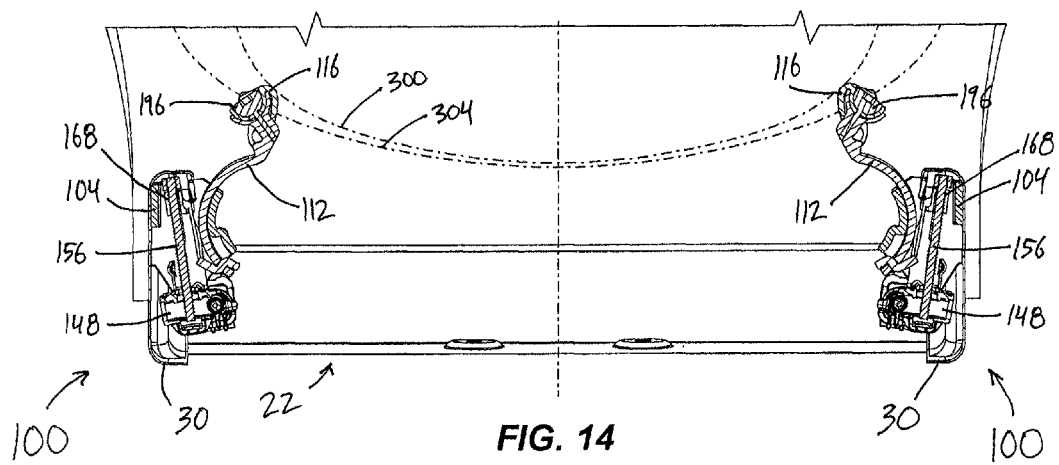
FIG. 14 is a top-down section view of the vehicle seat and the bolster assemblies of FIG. 2 with a 5th percentile female seat occupant.

The bolster assembly 100 adjusts to best fit the particular size and shape of the seat occupant. FIG. 13 illustrates a top-down cross-sectional view of a 95th percentile male (i.e., large and tall) seat occupant and, in contrast, FIG. 14 illustrates a top-down cross-sectional view of a 5th percentile female (i.e., short and thin) seat occupant. In FIGS. 13 and 14, the overlying seat cushion is not shown for clarity reasons, and the seat occupant is represented by a first curve 300 indicative of the seat occupant position against the paddle 116, and a second curve 304 indicative of the seat occupant position below the bolster assembly 100. Although in FIGS. 13 and 14 the seat occupant is represented as directly contacting the bolster assembly 100, this is done for illustrative purposes only and it is understood that overlying cushion would be positioned between the seat occupant and the bolster assembly. In FIG. 13, the bracket 112 is in the first, retracted position and in FIG. 14 the bracket 112 is in the second, extended position, both positions having been adjusted in order to bring the paddle 116 into contact with the particular seat occupant. The aforementioned rotating and pivoting movement of the paddle 116 under the influence of the motion and weight distribution of the seat occupant comfortably supports each occupant.

In addition to the motion described above, the paddle 116 is constructed of a flexible material such that the paddle 116 is resiliently deformable. In other words, one portion of the paddle 116, for example the lip member 276, can be resiliently deformed so as to move with respect to the rest of the paddle 116 without failure of the material. The paddle 116 may be made from nylon or another similar resilient material that is suitable for hot and cold temperatures. In particular, a portion of the paddle can deflect at least 5 millimeters. For example, the lip member 276 can deflect up to approximately 10 millimeters. In this way, the paddle 116 itself may deflect under the influence of a seat occupant in addition to the previously described rotation and/or pivoting.

Various features and advantages of the disclosure are set forth in the following claims.

What is claimed is:
1. A bolster assembly for a seat having a fixed frame, the bolster assembly comprising:
 a housing coupled to the fixed frame, the housing supporting a track;

a bracket moveable along at least a portion of the track between a first position and a second position;
a paddle moveably coupled to the bracket; and
a drive shaft configured for rotation about a drive axis; wherein rotation of the drive shaft about the drive axis moves the bracket between the first position and the second position,
wherein the paddle is moveably coupled to the bracket via a ball pivot.

2. The bolster assembly of claim 1, wherein the bracket includes a bowl portion, the paddle includes a dome portion, and the dome portion is operably positioned between the ball pivot and the bowl portion.

3. The bolster assembly of claim 2, wherein the ball pivot includes a shoulder and the bracket includes a stop, the shoulder and the stop cooperatively engaged to create a gap between the ball pivot and the bracket to accommodate the bowl portion.

4. The bolster assembly of claim 1, further comprising a pin coupling the paddle to the bracket, the pin having a first diameter.

5. The bolster assembly of claim 4, wherein the pin is engaged with the bracket through a threaded connection.

6. The bolster assembly of claim 4, wherein the pin is engaged with the bracket through a press-fit connection.

7. The bolster assembly of claim 4, wherein the paddle includes a bore through which the pin extends, the bore having a second diameter larger than the first diameter.

8. The bolster assembly of claim 7, wherein the second diameter is at least 70% greater than the first diameter.

9. The bolster assembly of claim 4, wherein the pin defines a longitudinal axis and the paddle is rotatable about the longitudinal axis relative to the bracket.

10. The bolster assembly of claim 9, wherein the longitudinal axis defines a first rotational plane orthogonal to the longitudinal axis in which the paddle is rotatable relative to the bracket, and wherein the paddle is rotatable relative to the bracket in a second rotational plane non-parallel to the first rotational plane.

11. The bolster assembly of claim 10, wherein the paddle is rotatable relative to the bracket in a third rotational plane that is non-parallel to the first rotational plane and non-parallel to the second rotational plane.

12. The bolster assembly of claim 1, wherein the ball pivot further includes a pin coupling the paddle to the bracket.

13. The bolster assembly of claim 1, wherein the paddle includes a portion, the portion is resiliently deflectable by at least 5 millimeters.

14. The bolster assembly of claim 1, wherein the track is arcuate and a portion of the bracket movable along the track is arcuate.

15. The bolster assembly of claim 1, further comprising a biasing member having a first end coupled to the housing and a second end coupled to the paddle.

16. The bolster assembly of claim 1, further including a traveling member coupled to the bracket and operatively associated with and movable by the drive shaft, wherein rotation of the drive shaft moves the traveling member to cause the bracket to move between the first position and the second position.

* * * * *